United States Patent [19]

Bossard et al.

[11] 4,341,922
[45] Jul. 27, 1982

[54] STRAIN-RELIEF BRACE FOR CABLE SPLICE CASE

[75] Inventors: Ronald G. Bossard, St. Paul; Robert B. Goodin, Brooklyn Park, both of Minn.

[73] Assignee: Minnesota Mining and Manufacturing Company, St. Paul, Minn.

[21] Appl. No.: 218,968

[22] Filed: Dec. 22, 1980

Related U.S. Application Data

[63] Continuation-in-part of Ser. No. 58,451, Jul. 18, 1979, Pat. No. 4,262,167.

[51] Int. Cl.³ .......................................... H02G 15/113
[52] U.S. Cl. ...................................... 174/92; 174/135
[58] Field of Search .............. 339/103 C, 107; 174/92, 174/135, 91

[56] References Cited

U.S. PATENT DOCUMENTS

4,295,005 10/1981 Daugherty ............................. 174/92

Primary Examiner—Roy N. Envall, Jr.
Attorney, Agent, or Firm—Cruzan Alexander; Donald W. Sell; James V. Lilly

[57] ABSTRACT

A strain-relief device for use in a cable splice case for communications cables comprises a horizontal portion having a plurality of tangs projecting therefrom, a vertical portion projecting upwardly from said horizontal portion, and reinforcing means between said horizontal and vertical portions. The tangs on the horizontal portion grip the outer sheath of a communications cable, while the vertical edge abuts the interior end of a cable collar extending through an end plate. The device relieves strain in the cable by allowing it to pass through to the outer shell of the cable splice case.

5 Claims, 23 Drawing Figures

STRAIN-RELIEF BRACE FOR CABLE SPLICE CASE

CROSS-REFERENCE TO RELATED APPLICATION

This is a continuation-in-part of copending application Ser. No. 58,451, filed July 18, 1979, and now U.S. Pat. No. 4,262,167.

This invention relates to enclosures for splice areas in telecommunications cables. More particularly it relates to devices for providing strain-relief in said enclosures.

Telephone cables may carry hundreds or thousands of pairs of insulated copper wires, enclosed in a flexible metal shield and one or more plastic tubular sheaths. To prevent ingress of moisture, the cable may be supplied with dry air or nitrogen under pressure, or may be filled with grease. Where two or more cable ends are connected together, as in extending a cable or in tapping into an extended cable, the splice areas must also necessarily be protected. By the term "cable end" is here meant an area of exposure of the insulated conductors by removal of the outer sheath or sheaths, shield, and any additional wrappings or coverings, whether or not the conductors themselves are terminated.

One prior art form of splice protection has involved enclosing the splice area between two trough-like half shells having constricted ends which fit snugly about the cable ends and against enclosed sealing rings or gaskets, as shown for example in U.S. Pat. No. 3,936,590. Only a narrow range of cable diameters can be accommodated.

Another well known form of splice case uses separate end plates and outer shells, different end plates permitting application to cable ends of different diameter, an example being shown in U.S. Pat. No. 3,636,241. The end plates, rather than the ends of the cover or shell, fit around the cable ends. Under conditions of application in the field, leak proof seals to the cable sheaths are time consuming, and difficult to attain, particularly when two or more cable ends are to pass through a single end plate. Reentry of the splice area, e.g., to add or delete a cable end, requires breaking of the bond between cable end and end plates.

A particular difficulty has been encountered in the application of splice cases to splice areas in pressurized double sheath cable installations where loss of pressure from within the inner sheath to the space between sheaths must be avoided. The industry has attempted to overcome the difficulty principally by wrapping and adjacent ends of the sheaths with a series of adhesive tapes, forming an elongate wrapped or bandaged area which must be enclosed within an outer shell and necessitating the substitution of a shell of drastically increased length.

The present invention employs a longitudinally split outer shell and a choice of segmented end plates, which themselves have novel features, while in addition and more particularly providing novel cable collar means which are separate from the end plates and may therefore be applied independently, for example, in the factory and under controlled conditions as well as in the field. Reentry without disruption of the seal to the cable end is made possible. Splice areas involving double sheath cable ends are covered without requiring a shell of extended length.

These and other features of the invention will now be described in more detail in connection with the appended drawing, in which.

Figure 1:
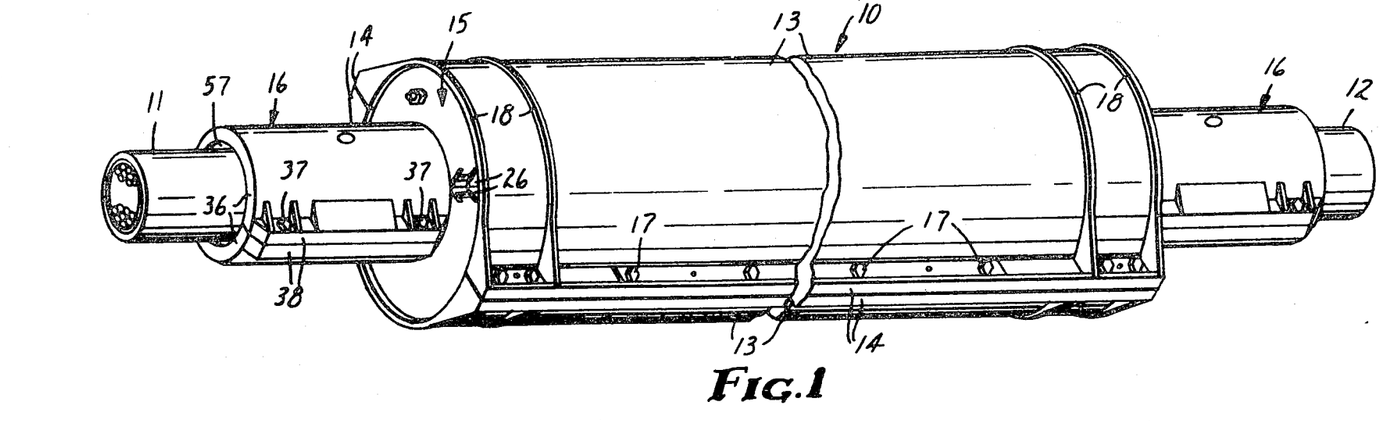
FIG. 1 is a view in perspective of a splice case of the invention, as applied to a cable splice area.

FIG. 1 illustrates a cable splice case 10 applied over a splice area between two double sheath cable ends 11, 12. The case comprises two identical generally semicylindrical half shells 13 joined together at flanges 14, single opening end plates 15, and cable collars 16.

Figure 2:
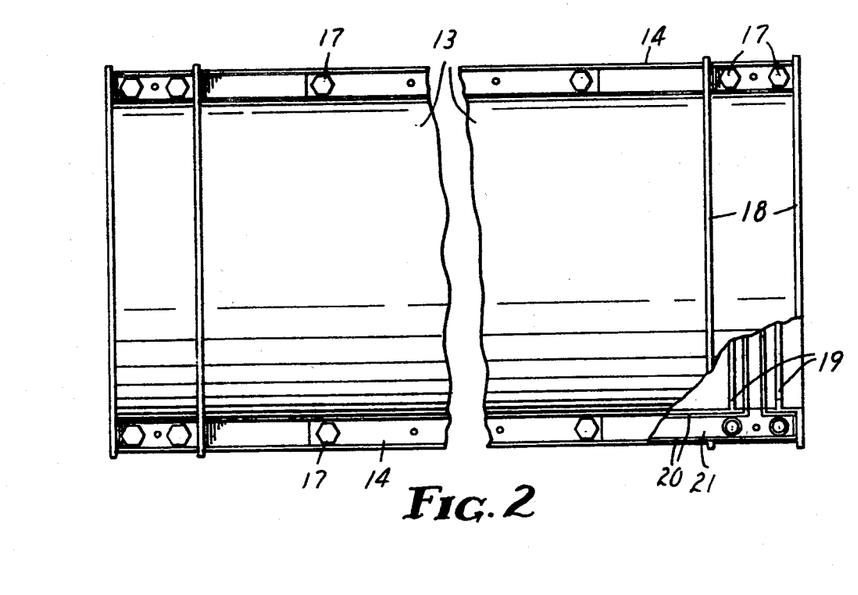
FIG. 2 is a plan view, partly in section, of the outer cover or shell of the case of FIG. 1.
Figure 3:
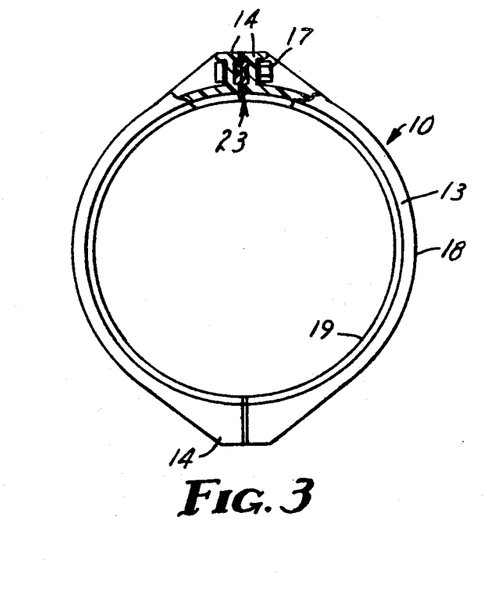
FIG. 3 is an end elevation of the shell of FIG. 2, partly in section.
Figure 4:
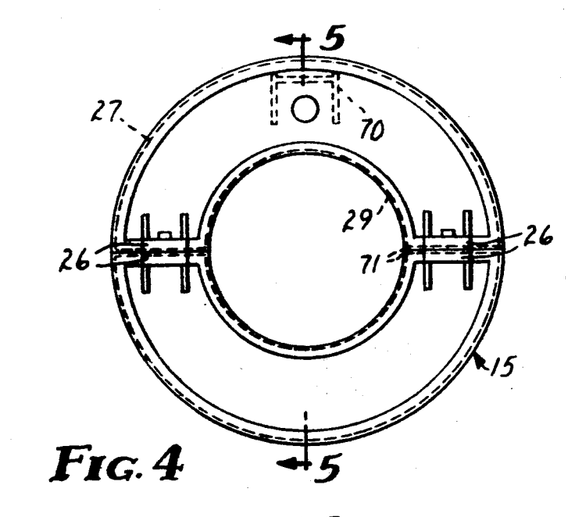
FIG. 4 is a front elevation of one form of end plate assembly having a single cable passage.
Figure 5:
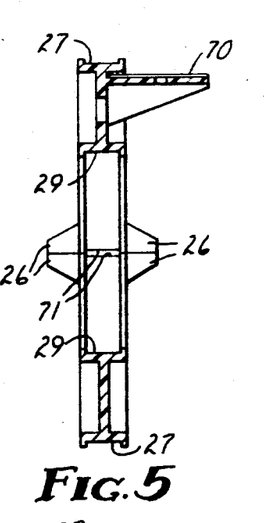
FIG. 5 is a sectional view at 5—5 of the assembly of FIG. 4.
Figure 6:
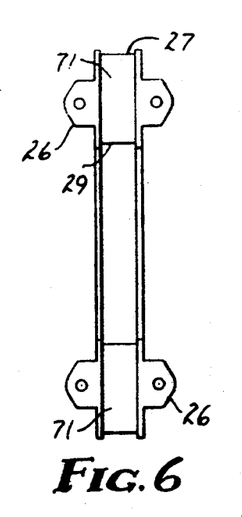
FIG. 6 is an inner edge view of one segment of the end plate of FIG. 4.
Figure 7:
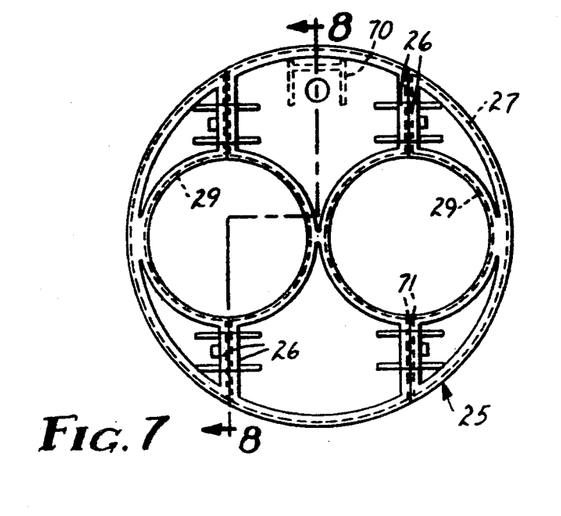
FIG. 7 is a front elevation of an end plate assembly having two cable passages.
Figure 8:
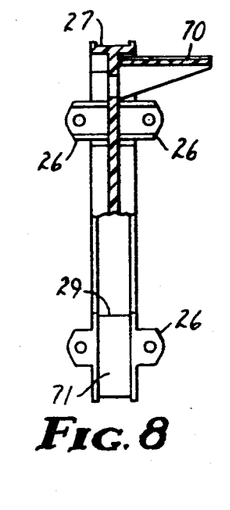
FIG. 8 is a section at 8—8 of the assembly of FIG. 7.

The shells 13 are shown in more detail in FIGS. 2 and 3. The flanges 14 are perforate to receive fasteners 17. External parallel ridges 18 at each end provide reinforcement at the end areas and internal ridges 19 define the location of the end plates in the assembled case.

Figure 11:
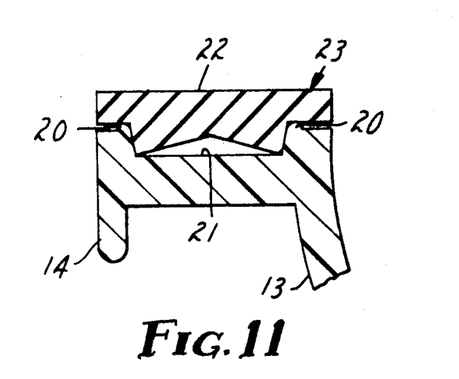
FIG. 11 is a section at 11—11 of the gasket of FIG. 9 together with a portion of the retaining flange of the shell.

The faces of the flanges 14 are longitudinally ridged and grooved, with rounded ridges 20 along both sides of slant sided groove 21 (FIG. 11). The side members 22 of gasket 23 of FIG. 9, the thickened central portion of which has a concave transverse section as shown in FIG. 11, fit over these flange faces and when compressed in place by fasteners 17 provide a leakproof seal.

Figure 9:
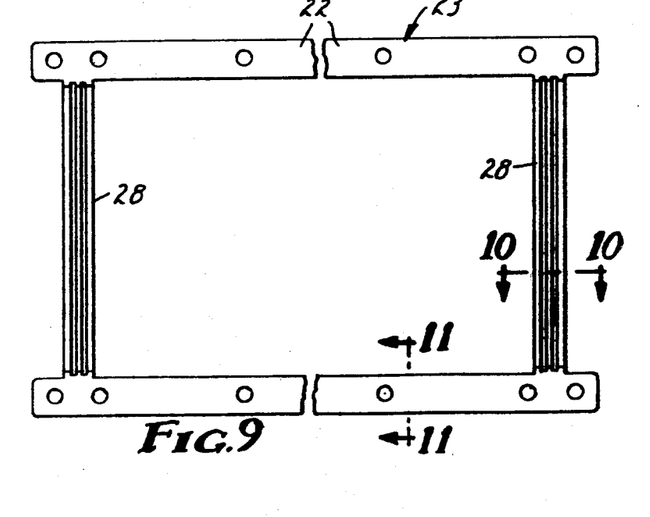
FIG. 9 is a plan view of a preferred form of shell gasket.

The longitudinally ridged and grooved end members 28 of the gasket 23 lie between the internal ridges 19.

Figure 10:
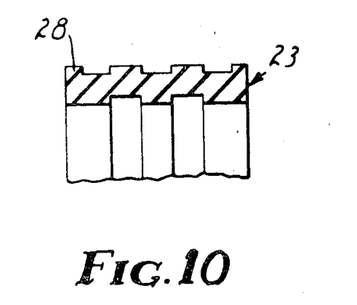
FIG. 10 is a section at 10—10 of the gasket of FIG. 9.
Figure 13:
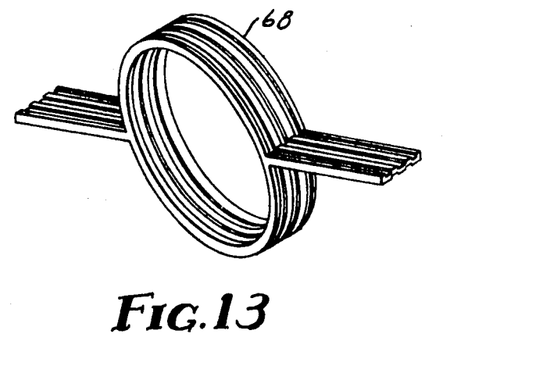
FIG. 13 is a view in perspective of a preferred form of end plate gasket.

Circular end plates 15 and 25 (FIGS. 4–8) will be seen to be in segments, being divided along planes parallel to the axis and diametrically of each cable passage. The segments are channeled about their peripheries and are held together and about the cable collar or collars by fasteners passing through opposed lugs 26. External channels 27 receive end members 28 of gasket 23; internal channels 29 and 71 are provided to receive gaskets 68 (FIG. 13) which have the same ridged and grooved cross section as said end members 28 and as shown more clearly in FIG. 10.

End plates with apertures for three or more cable ends are sometimes required and are analogously segmented, grooved, and provided with fasteners and lugs. In each instance the number of segments is one more than the number of apertures.

Figure 12:
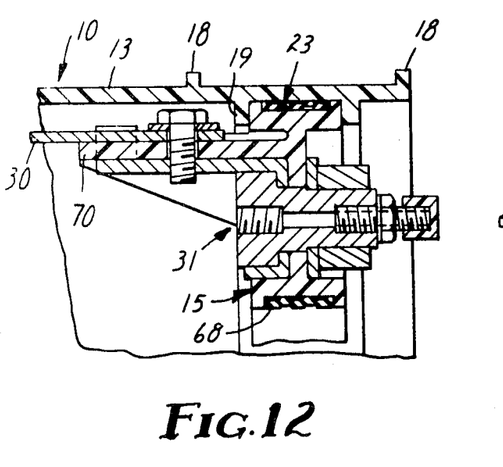
FIG. 12 is a detail in cross section showing a portion of an end plate equipped with tie bar bracket and gas fitting.

The two end plates will normally be tied together in predetermined radial and axial position within the case by a tie bar 30 (FIG. 12) extending between the plates and attached at each plate to a tie bar fitting assembly 31 which is supported by lugs 70 extending from opposed end plate segments. The assembly 31 is perforate, e.g. for introduction of gas under pressure where desired. It may also serve as an external ground connection when connected internally of the shell to the cable shield. The fitting is normally closed to prevent flow of gas.

Exemplary cable collar structures are next to be described.

Figure 14:
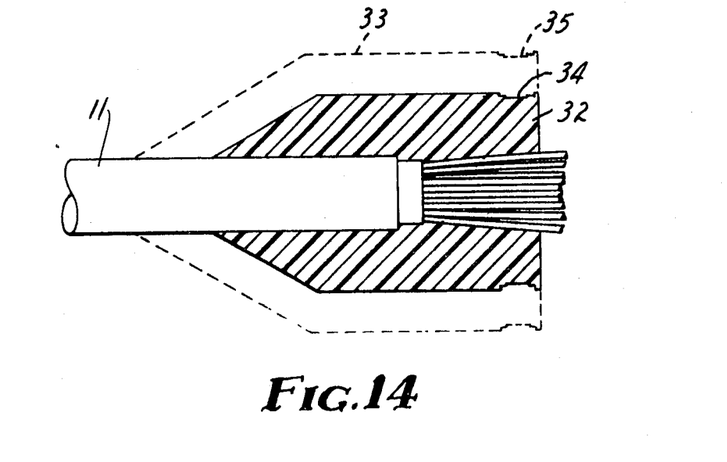
FIG. 14 is a view in longitudinal cross section of a molded cable collar applied on a single sheath cable end, with a one piece mold indicated in dotted outline.

FIG. 14 illustrates a cable end 11 provided with a unitary polymeric molded cable collar 32. The molding composition, e.g., a known polyurethane composition, is applied as a liquid in a tubular mold 33 having a constricted end fitting closely about the cable. The composition penetrates and seals all of the interstices at the cable end and hardens to a gas impervious adherent body having an annular groove 34 around the end adjacent the exposed wires. For factory application this form of cable collar permits rapid and uniform production. The mold 33 may be in two segments so that it may be removed and reused after the liquid composition has hardened. It may equally well be of unitary construction, in which case it is itself formed with annular groove 35 and remains in place as additional reinforcement.

Figure 15:
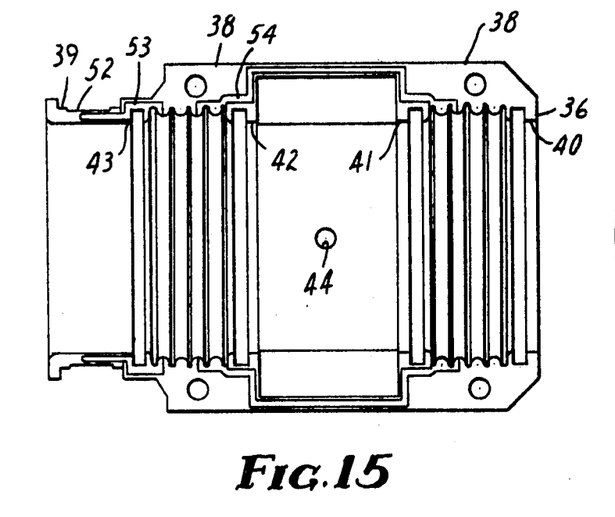
FIG. 15 is a top plan view of the bottom half of a cable collar assembly for a double sheath cable end.
Figure 16:
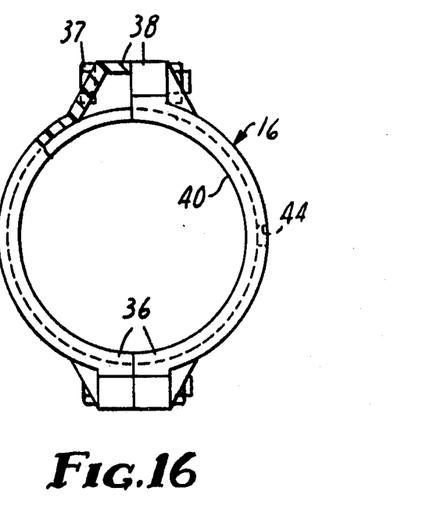
FIG. 16 is an end elevation of the assembled cable collar partly in section.

The cable collar 16 of FIG. 1 is generally tubular in shape and is formed of two substantially identical longitudinally flanged semicylindrical halves 36 as shown in FIGS. 15 and 16, held together by fasteners 37 passing through opposed flanges 38. The collar is externally grooved at one end at groove 39 and internally ribbed at ribs 40–43. Between adjacent ribs 40–41 and 42–43 the inner surface is ridged and grooved as shown; between ribs 41 and 43 the interior is expanded within the flanged area to form a chamber of enlarged cross section, and one of the halves may be perforate as at opening 44 for purposes to be described.

The collar 16 is particularly useful with double sheath cable, making possible a gas tight seal to both inner and outer sheaths and isolating the two while requiring no extension of the shell length.

Figure 17:
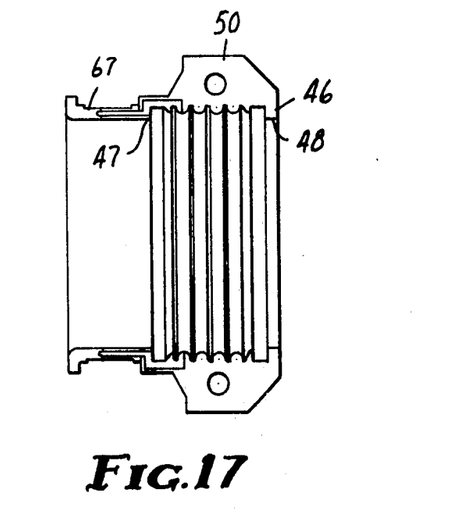
FIG. 17 is a top plan view of the bottom half of a cable collar assembly for a single sheath cable end.
Figure 18:
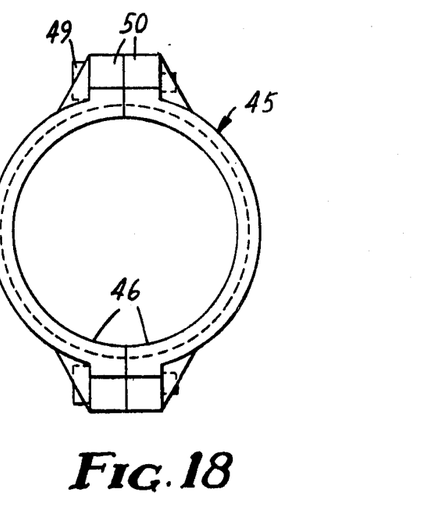
FIG. 18 is an end elevation of the assembled cable collar.

A simpler form of collar assembly 45, formed of two halves 46, is shown in FIGS. 17 and 18 to provide an outer annular groove 67 and a single pair of inner ribs 47, 48, the latter separated by a ridged and grooved surface as in the collar of FIG. 15. The two collar halves are held together by fasteners 49 passing through opposed flanges 50.

Figure 20:
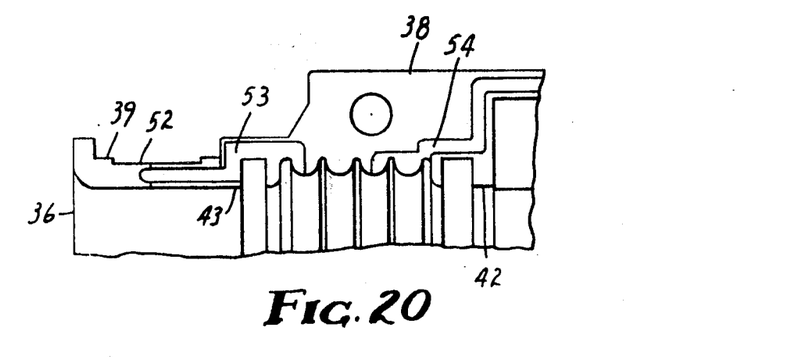
FIG. 20 shows a detail of the structure of FIGS. 15 and 17.

Additional structural details applicable to collar halves 36 and 46 are given in FIG. 20 which shows on an enlarged scale an end portion of a longitudinal flanged edge of the half collar of FIG. 15.

The bottom wall of the groove 39 is shown in FIG. 20 to be centrally shallowly grooved at groove 52, for the purpose of positioning a gasket 68 during assembly of the case. The same structure is applicable also to the cable collars of FIGS. 14 and 17. The ring portion of the gasket is thereby located in place centrally of groove 39 and in position to fit precisely within the interior grooves 29 and 71 of end plate 15.

Slight inwardly open depressions 53, 54 are also provided in the flat flanged edge surface of the collar half 36 adjacent the ridged and grooved surface and the ribs 43, 42, as further indicated in FIG. 20. Analogous edge structure is indicated in the half collar of FIG. 17. These depressions result in a shallow cavity between the opposing flanges, which is open inwardly of the collar.

Figure 19:
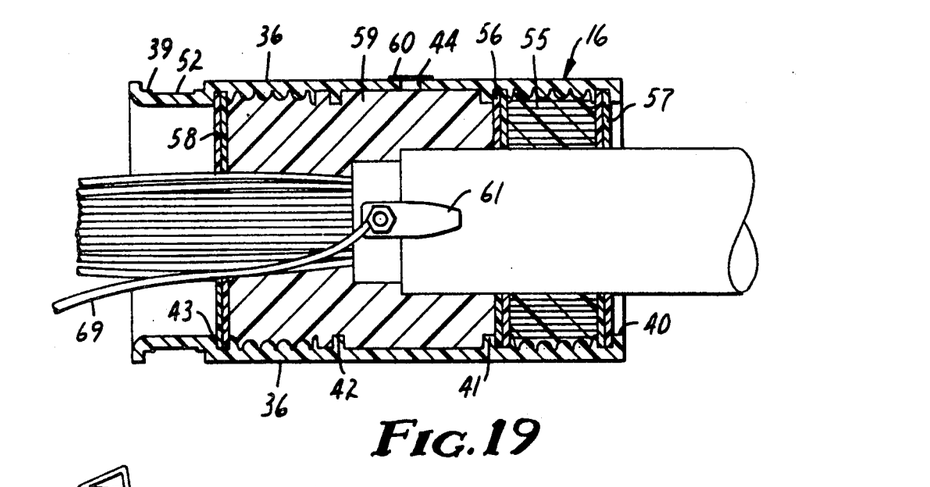
FIG. 19 is a view in longitudinal cross section showing an encapsulated single sheath cable end in a cable collar assembly as illustrated in FIGS. 15 and 16.

Another application of the cable collar of FIGS. 15 and 16 is shown in FIG. 19. The collar, sealed to the cable by mastic sealant 55 between pairs of split half washers 56, 57, and with the separated conductors and ground connection compacted for passing through a third pair of half washers 58, is filled with liquid encapsulant or molding composition which penetrates and seals the interstices in the cable end and then hardens as polymeric filler 59. The liquid may be applied through the central opening 44 which may then be sealed, e.g. with adhesive tape 60, or the washer 58 may be omitted, the opening 44 sealed, and the liquid poured into the open end of the collar while the latter is held upright.

FIG. 19 further illustrates one method of maintaining contact with the cable shield. A metal probe 61 is forced between the sheath and shield at the end, and a conductor 69 attached to the probe extends across the splice area to a similar probe in the adjacent cable end. Altenatively, the conductor 69 may be attached to the conductive tie bar fitting of FIG. 12 or to an external metal contact member sealed within the hole 44.

Figure 21:
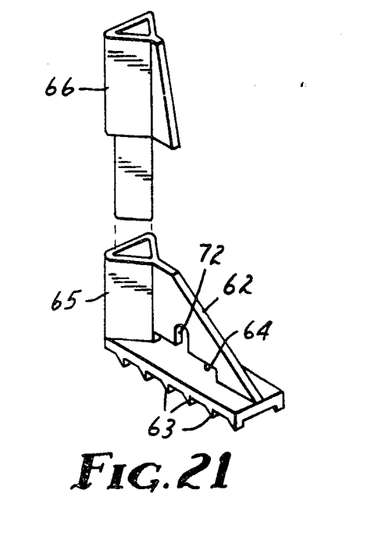
FIG. 21 is a view in perspective of one embodiment of a strain-relief element.

Strain relief is supplied by means of reinforced braces 62 (FIG. 21), two or more of which are to be uniformly spaced and strapped to the cable end inwardly of the end plates. The braces grip the outer cable sheath with extended tangs 63 and are held firmly in place by a strap type hose clamp, not shown, passing around the cable and through the opening 64, with the upright 65 braced against the end of the cable collar as it extends through the end plate within the case. A bolt, not shown, may be fastened within aperture 72 to serve as a common point of attachment for ground conductors 69. An extension 66 fitting within the open upright may be added when needed for use with cables of smaller diameter.

Figure 22:
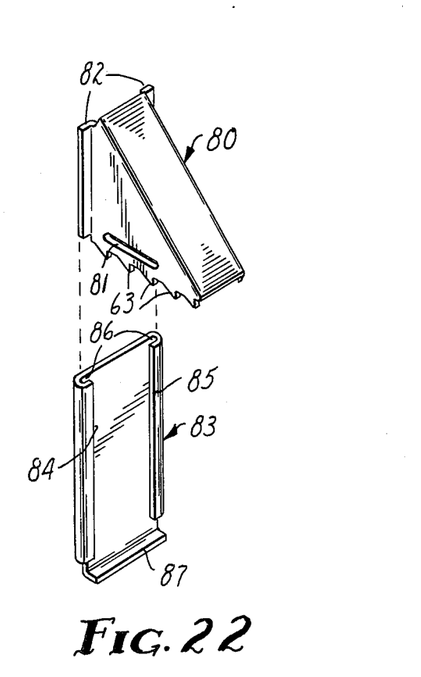
FIG. 22 is a view in perspective of another embodiment of a strain-relief element.

An alternative embodiment of a strain-relief device is shown in FIG. 22. In this embodiment the device 80 has extended tangs 63 for gripping the outer cable sheath, opening 81 to receive a hose clamp (not shown), upright 82 (here comprising two outwardly flanged projections) for bracing against the end of a cable collar as it extends through the end plate within the case, and an extension fitting 83, designed to receive the outwardly flanged projections of upright 82, for use with cables of smaller diameter. As shown, extension fitting 83 comprises two arms 84, 85 which define (a) a space therebetween and (b) U-shaped slots 86. A base portion 87 is provided. In use fitting 83 slidably receives device 80 so that the flanged projections of upright 82 fit within U-shaped channels 86 and rest upon base 87.

The strain-relief device interacts with the various components of and in the splice case 10 to relieve strain caused by forces placed on the cable. Thus, with reference to FIG. 23, after installation of the strain-relief device 80, relative movement between the components of the splice case 10 is prevented by both the gripping action of the tangs 63 on the cable due to the pressure exerted by the hose clamp 90 and by the forces exerted on the interior end of the cable collar 45 where the upright 82 or extension 83 abuts it. Axial movement between the cable collar 45 and the end plate 15, and between the end plate 15 and the outer cover or shell 13 is limited by the interlocking ribs and recesses of the splice case components.

Figure 23:
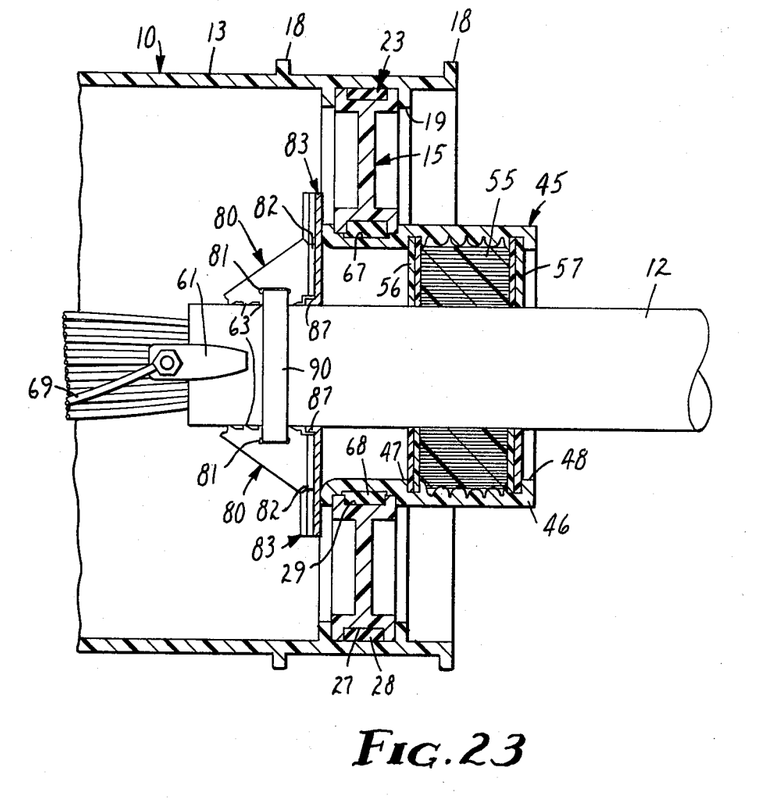
FIG. 23 is a longitudinal section of one end of the assembled splice case of FIG. 1.

When a stress, such as an axial stress, is applied to the cables, several events occur. First, a small initial displacement eliminates any clearances between the components of the system. The axial force is symmetrically transferred from the outer cable sheath to the strain-relief device 80, then to the cable collar 45, then to the end plate 15, and finally to the outer cover or shell 11 of the splice case 10.

If either a force which causes stress relaxation in the outer cable sheath or a force which causes deformation of the outer cable sheath is applied, a pivoting action occurs in each strain-relief device 80 which causes the devices to grip the outer cable sheath more securely. The hose clamp 90 by which the devices 80 are secured to the cable establishes a center of rotation for the pivoting action. The vertical height of the cable collar end against which the devices abut, together with the horizontal length of the device determine the mechanical advantage and tightening force generated during the strain relief action.

An illustrative procedure for application of the cable splice case to a cable splice area in a double sheath cable installation will now be described in terms primarily of the installation illustrated in FIG. 1.

The cable ends are prepared by cutting back the outer layers to allow access to the metal shield and to expose the inner sheath, and are suitably positioned on a rack or other support and temporarily clamped in place. Ground connectors, for example as described in U.S. Pat. No. 3,778,749, are applied to the shields and interconnected. A bottom half shell, with its gasket and the lower portions of the two end plates installed, is supported in place beneath the splice area to assist in properly locating the cable collars. Mastic tape of appropriate width is convolutely wound about the outer and inner sheaths of each cable at the required locations and to required thickness, sufficient to slightly overfill the designated spaces within the collars, and washers are placed over the cable ends and against both sides of each winding. A suitable tape is an uncured compounded butyl rubber product such as Western Electric "B" Sealing Tape. The washers are desirably composed of pairs of half-washers as described and claimed in copending application Ser. No. 58,449, filed July 18, 1979, now U.S. Pat. No. 4,262,168.

The cable collars are next applied. The bottom half of the collar is put in place beneath the cable at the mastic winding, strips of mastic are placed within the edge depressions, the upper half is applied, and the two fastened tightly together. The washers fit against the retaining ribs. As the two halves of the collar are drawn together, the mastic conforms and seals to the ridged and grooved surface between the ribs and to the washers and the cable sheaths, and the washers are forced against the retaining ribs and are bowed or bulged slightly under the force transmitted by the surplus mastic.

Ring gaskets 68 (FIG. 13) are next placed over the ends of the collars, fitting into the secondary grooves 52. The collars are laid against the lower end plate segments and the upper segments are applied and fastened in place.

A tie bar 30 of appropriate length is nested into end plate lugs 70 and fastened firmly in place. The opposite wire ends are then connected, during which process the lower half-shell may, if desired, be removed for ease of access to the splice area. After strain relief fittings have been added, the two gasketed halves of the outer shell are assembled over the whole to complete the operation. There is achieved a hermetically sealed, moisture and gas proof, compact, reopenable splice area enclosure. Passage of gas or moisture from between outer and inner sheath to the area of the insulated wires across the cut end of the inner sheath is prevented, without requiring an unduly elongate outer shell.

In place of the ring gaskets 68, strips of mastic tape or cord may less conveniently be made to serve as gaskets in the grooves 29 and 71 of the end plate segments, thereby permitting application of the splice case over a previously completed cable junction.

Although each of the cable collar structures described is capable of effective preparation and application under field conditions, a particular advantage is to be attained where these components are preattached to cable ends in the factory. Cable collars dimensioned to fit specified end plate openings are capable of application to cable ends of various diameters, thereby enhancing the versatility of the system while assuring a fully effective seal between collar and end plate.

A further advantage accruing from the use of separate cable collars is that the seal to the cable remains unbroken during reentry, for example when adding or deleting a cable end. The same cable and cable collar assembly may thus be used with a variety of end plates depending on the particular service arrangements required.

What is claimed is as follows:

1. A device for relieving strain while a cable splice case which encloses a splice area in a communications cable of a communications system, said cable splice case having an outer shell, one end plate at each end of said case for receiving at least one cable collar, and one cable collar around each cable end, said device comprising
    a horizontal portion having a plurality of downwardly projecting tangs which grip the outer sheath of said communications cable,
    a vertical portion projecting upwardly from said horizontal portion for abutment against the interior end of a cable collar extending through said end plate of said cable splice case,
    reinforcing means between said horizontal portion and said vertical portion, said reinforcing means having receiving means for receiving an element for clamping said device to said communications cable.

2. A device in accordance with claim 1 wherein said vertical portion comprises an upright body having a triangular cross-section with respect to its vertical axis, and wherein said vertical portion is hollow and open at its top.

3. A device in accordance with claim 2 wherein a vertical extension is received within said hollow vertical portion.

4. A device in accordance with claim 1 wherein said vertical portion comprises outwardly flanged projections.

5. A device in accordance with claim 4 wherein a vertical extension is received around said outwardly flanged projections.

* * * * *

UNITED STATES PATENT AND TRADEMARK OFFICE
CERTIFICATE OF CORRECTION

PATENT NO. : 4,341,922
DATED : July 27, 1982
INVENTOR(S) : Ronald G. Bossard and Robert B. Goodin It is certified that error appears in the above—identified patent and that said Letters Patent is hereby corrected as shown below:

Col. 3, line 56, "43" should read --42--.

Signed and Sealed this

Twelfth Day of October 1982

[SEAL]

Attest:

GERALD J. MOSSINGHOFF

Attesting Officer     Commissioner of Patents and Trademarks